United States Patent
Wu (10) Patent No.: US 10,278,068 B2
(45) Date of Patent: *Apr. 30, 2019

(54) DEVICE AND METHOD OF HANDLING CELLULAR-WIRELESS LOCAL AREA NETWORK AGGREGATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 279 days.

This patent is subject to a terminal disclaimer.

(21) Appl. No.: 15/212,291

(22) Filed: Jul. 18, 2016

(65) Prior Publication Data

US 2017/0019782 A1    Jan. 19, 2017

Related U.S. Application Data

(60) Provisional application No. 62/193,602, filed on Jul. 17, 2015.

(51) Int. Cl.
*H04W 12/04* (2009.01)
*H04W 76/36* (2018.01)
(Continued)

(52) U.S. Cl.
CPC .......... *H04W 12/04* (2013.01); *H04W 12/06* (2013.01); *H04W 76/15* (2018.02); *H04W 76/36* (2018.02); *H04L 2463/061* (2013.01)

(58) Field of Classification Search
CPC ..... H04W 76/27; H04W 76/30; H04W 76/34; H04W 76/36; H04L 47/827
See application file for complete search history.

(56) References Cited

U.S. PATENT DOCUMENTS

| 2004/0205158 A1* | 10/2004 | Hsu ............ H04W 48/18 709/218 |
| 2013/0095789 A1* | 4/2013 | Keevill ............ H04W 12/06 455/411 |

(Continued)

OTHER PUBLICATIONS

Cisco, Architecture for Mobile Data Offload over Wi-Fi Access Networks, 23 pages (Year: 2012).*

(Continued)

*Primary Examiner* — Ali S Abyaneh
*Assistant Examiner* — Huan V Doan
(74) *Attorney, Agent, or Firm* — Winston Hsu (57) ABSTRACT

A communication device of handling communication with a network including a cellular network and a wireless local area network (WLAN) comprises instructions of receiving a radio resource control (RRC) message configuring cellular-WLAN aggregation (CWA) to the communication device from a base station (BS) of the cellular network; deriving a first pairwise master key (PMK) according to the RRC message; deriving a first encryption key for encrypting first data transmitted to the WLAN or decrypting second data received from the WLAN from the first PMK; releasing the CWA during connecting to the WLAN; performing an extensible authentication protocol (EAP) authentication and key agreement (AKA) procedure with the WLAN to derive a second PMK, when releasing the CWA; and deriving a second encryption key for encrypting third data transmitted to the WLAN or decrypting fourth data received from the WLAN from the second PMK.

10 Claims, 6 Drawing Sheets

(51) Int. Cl.
*H04W 76/15* (2018.01)
*H04W 12/06* (2009.01)

(56) References Cited

U.S. PATENT DOCUMENTS

| | | | | |
|---|---|---|---|---|
| 2014/0086211 | A1* | 3/2014 | Liu | H04L 45/38 370/331 |
| 2014/0181904 | A1* | 6/2014 | Craig | H04W 12/04 726/3 |
| 2015/0121490 | A1* | 4/2015 | Liu | H04W 12/04 726/6 |
| 2015/0223128 | A1* | 8/2015 | Liu | H04W 36/14 370/338 |
| 2015/0245268 | A1* | 8/2015 | Williams | H04W 76/14 370/331 |
| 2016/0309384 | A1* | 10/2016 | Zhang | H04W 12/06 |
| 2016/0338133 | A1* | 11/2016 | Lee | H04W 72/12 |
| 2017/0070923 | A1* | 3/2017 | Li | H04W 36/0066 |
| 2017/0264606 | A1* | 9/2017 | Forssell | H04L 63/0815 |
| 2017/0331688 | A1* | 11/2017 | Mestanov | H04L 63/20 |
| 2018/0227752 | A1* | 8/2018 | Teyeb | H04W 12/04 |

OTHER PUBLICATIONS

3GPP TS 36.300 V12.6.0 (Jun. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
3GPP TS 36.331 V12.6.0 (Jun. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).
3GPP TS 36.321 V12.6.0 (Jun. 2015) Technical Specification 3rd Generation Partnership Project; Technical Specification Group Radio Access Network; Evolved Universal Terrestrial Radio Access (E-UTRA); Medium Access Control (MAC) protocol specification (Release 12).
3GPP TS 36.323 V12.4.0 (Jun. 2015) Technical Specification 3rd Generation Partnership Project; Technical Specification Group Radio Access Network; Evolved Universal Terrestrial Radio Access (E-UTRA); Packet Data Convergence Protocol (PDCP) specification (Release 12).
3GPP TS 33.234 V12.1.0 (Sep. 2014) Technical Specification 3rd Generation Partnership Project; Technical Specification Group Services and System Aspects; 3G Security; Wireless Local Area Network (WLAN) interworking security (Release 12).
3GPP TSG-RAN WG2 Meeting #90 R2-152655 Fukuoka, Japan, May 25-29, 2015 Agenda Item: 7.6.2.1 Source: Huawei, HiSilicon Title: Authentication and encryption between UE and WLAN for aggregation Document for: Approval.
3GPP TSG RAN WG2 Meeting #90 R2-152125 Fukuoka, Japan, May 25-29, 2015 Agenda item:7.6.2.1 Source:CATT Title:Discussion on Architectural and Procedure of C-plane for LTE-WLAN Aggregation Document for:Discussion and Decision.
3GPP TSG-RAN WG2 Meeting #90 R2-152126 Fukuoka, Japan, May 25-29, 2015 Source:CATT Title: Discussion on mobility procedures of aggregation bearer Agenda Item:7.6.2.1 Document for:Discussion and Decision.
3GPP TSG-RAN WG2 Meeting #90 R2-152616 Fukuoka, Japan, May 25-29, 2015 Agenda item:7.6.2.2 Source:Alcatel-Lucent, Alcatel-Lucent Shanghai Bell Title:Further considerations on the user plane architecture for LTE-WiFi aggregation Document for:Discussion & Decision.
Search Report dated Dec. 13, 2016 for EP application No. 16179921.8, pp. 1-7.
Search Report dated Mar. 16, 2017 for EP application No. 16179921.8, pp. 1-11.
Huawei, HiSilicon, "Authentication and encryption between UE and WLAN for aggregation", 3GPP TSG-RAN WG2 Meeting #90, R2-152655, May 25-29, 2015, Fukuoka, Japan, XP050972898, pp. 1-3.
Intel Corporation, "WLAN authentication and security aspects of LTE/WLAN aggregation", 3GPP TSG-RAN2 Meeting #90, R2-152222, May 25-29, 2015, Fukuoka, Japan, XP050972904, pp. 1-7.
3GPP TS 24.234 V7.5.0 (Mar. 2007), 3rd Generation Partnership Project: Technical Specification Group Core Network and Terminals; 3GPP System to Wireless Local Area Network (WLAN) Interworking; WLAN User Equipment (WLAN UE) to network protocols; Stage 3(Release 7), XP003025533, pp. 1-32.

* cited by examiner

FIG. 6

DEVICE AND METHOD OF HANDLING CELLULAR-WIRELESS LOCAL AREA NETWORK AGGREGATION

CROSS REFERENCE TO RELATED APPLICATIONS

This application claims the benefit of U.S. Provisional Application No. 62/193,602, filed on Jul. 17, 2015, which is incorporated herein by reference.

BACKGROUND OF THE INVENTION

1. Field of the Invention

The present invention relates to a communication device and a method used in a wireless communication system, and more particularly, to a communication device and method of handling communication in aggregation of cellular network and wireless local area network in a wireless communication system.

2. Description of the Prior Art

Cellular-wireless local area network (WLAN) aggregation (CWA) is used for increasing data rate. However, it is unknown how to handle a connection with a WLAN, when a user equipment (UE) connects to an evolved Node-B (eNB) of an evolved universal terrestrial radio access network (E-UTRAN) and one of the following conditions occurs: the WLAN is handed over to another eNB of the E-UTRAN, the WLAN is handed over to another radio access technology (RAT) or the UE detects a failure, e.g. a radio link failure in the E-UTRAN.

Thus, how to handle the CWA is an important problem to be solved.

SUMMARY OF THE INVENTION

The present invention therefore provides a method and related communication device for handling the CWA to solve the abovementioned problem.

A communication device of handling communication with a network including a cellular network and a wireless local area network (WLAN) comprises a storage unit for storing instructions and a processing means coupled to the storage unit. The processing means is configured to execute the instructions stored in the storage unit. The instructions comprise receiving a radio resource control (RRC) message configuring cellular-WLAN aggregation (CWA) to the communication device from a base station (BS) of the cellular network; deriving a first pairwise master key (PMK) according to the RRC message; deriving a first encryption key for encrypting first data transmitted to the WLAN or decrypting second data received from the WLAN from the first PMK; releasing the CWA during connecting to the WLAN; performing an extensible authentication protocol (EAP) authentication and key agreement (AKA) procedure with the WLAN to derive a second PMK, when releasing the CWA; and deriving a second encryption key for encrypting third data transmitted to the WLAN or decrypting fourth data received from the WLAN from the second PMK.

A wireless local area network (WLAN) of handling cellular-WLAN aggregation comprises a storage unit for storing instructions and a processing means coupled to the storage unit. The processing means is configured to execute the instructions stored in the storage unit. The instructions comprise being configured to enable communication of a plurality of cellular protocol data units (PDUs) with a communication device; receiving a message including a first pairwise master key (PMK) from a cellular network for the communication of the plurality of cellular PDUs with the communication device; communicating first data with the communication device using a first encryption key derived from the first PMK; and performing an extensible authentication protocol (EAP) authentication and key agreement (AKA) procedure with the communication device when the WLAN is configured to release the communication of the plurality of cellular PDUs with the communication device.

A communication device of handling a communication with a network including a cellular network and a wireless local area network (WLAN) comprises a storage unit for storing instructions and a processing means coupled to the storage unit. The processing means is configured to execute the instructions stored in the storage unit. The instructions comprise being configured a first internet protocol (IP) address by the cellular network; receiving a radio resource control (RRC) message configuring cellular-WLAN aggregation (CWA) to the communication device from a base station (BS) of the cellular network; communicating a first WLAN media access control (MAC) protocol data unit (PDU) (MPDU) including a cellular PDU with the WLAN, wherein the cellular PDU includes a first IP packet including the first IP address; releasing the CWA during connecting to the WLAN; and initiating a dynamic host configuration protocol (DHCP) procedure for requesting a second IP address via the WLAN to a DHCP server, when releasing the CWA; and transmitting a second WLAN MPDU including a second IP packet including the second IP address with the WLAN.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
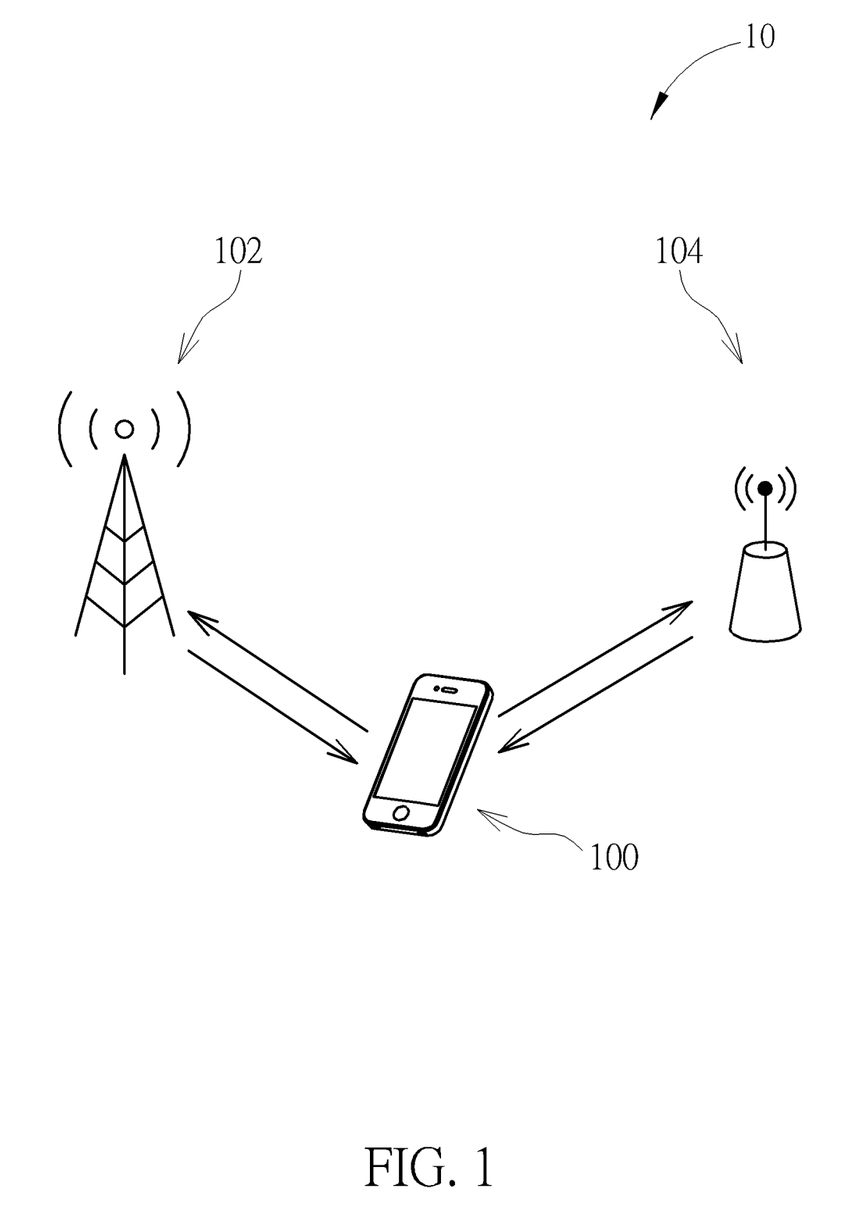
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and an access point (AP) 104. In FIG. 1, the communication device 100, the BS 102 and AP 104 are simply utilized for illustrating the structure of the wireless communication system 10. In one example, the BS 102 may be an evolved Node-B (eNB) in an evolved universal terrestrial radio access network (E-UTRAN) of a long term evolution (LTE) system, or a fifth generation (5G) BS employing orthogonal frequency-division multiplexing (OFDM) and/or non-OFDM for communicating with the communication device 100 in a carrier frequency with a wider bandwidth (e.g., greater than 20 MHz) or a shorter time interval (e.g., less than 1 ms) of transmission. The AP 104 may be a network entity in a wireless local area network (WLAN). The communication device 100 and the AP 104 may support IEEE 802.11 related standards (e.g., IEEE 802.11a/b/g/n/ac/ad/x). In one example, the AP 104 may connect to the BS 102 directly or via a WLAN termination. The WLAN termination may connect to the BS 102 via an Xw interface.

In FIG. 1, the communication device 100 may be configured to communicate with the BS 102 and the AP 104 at the same time according to cellular-WLAN aggregation (CWA) or 5G-WLAN aggregation configured to the communication device 100. That is, the communication device 100 performs a transmission/reception to/from the BS 102 via the LTE/5G and the AP 104 via the WLAN. In addition, the communication device 100 communicates with the BS 102 via one or more radio bearer (s) utilizing the LTE, 5G resource(s) and/or the WLAN resource(s).

The communication device 100 may be a user equipment (UE), a mobile phone, a laptop, a tablet computer, an electronic book, a portable computer system, a vehicle or an aircraft. In addition, for an uplink (UL), the communication device 100 is a transmitter and the BS 102 and AP 104 are receivers, and for a downlink (DL), the BS 102 and AP 104 are transmitters and the communication device 100 is a receiver.

Figure 2:
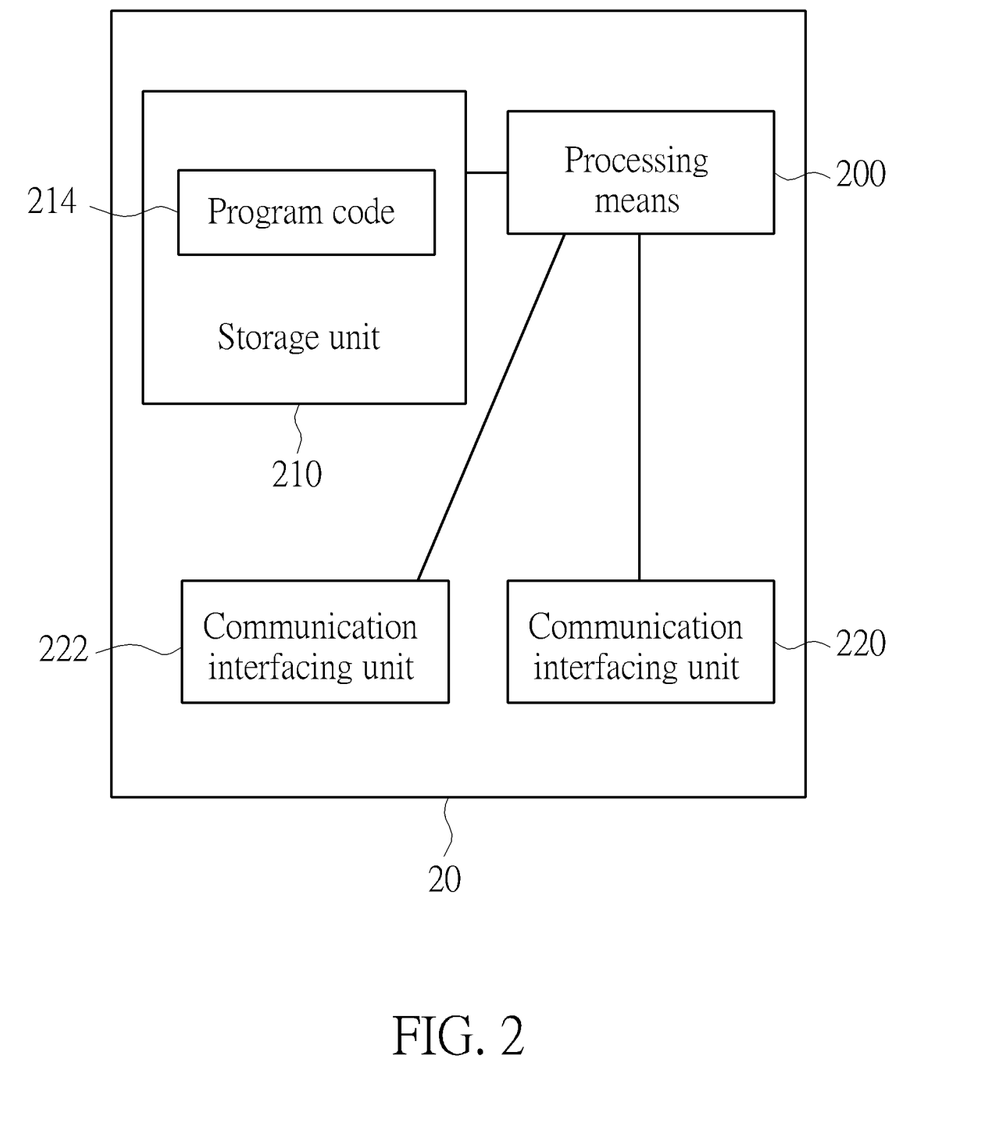
FIG. 2 is a schematic diagram of a communication device according to an example of the present invention.

FIG. 2 is a schematic diagram of a communication device 20 according to an example of the present invention. The communication device 20 may be the communication device 100, the BS 102 or the AP 104 shown in FIG. 1, but is not limited herein. The communication device 20 may include a processing means 200 such as a microprocessor or Application Specific Integrated Circuit (ASIC), a storage unit 210, a communication interfacing unit 220 for LTE/5G transmission/reception, and a communication interfacing unit 222 for WLAN (e.g., WiFi) transmission/reception. The storage unit 210 may be any data storage device that may store a program code 214, accessed and executed by the processing means 200. Examples of the storage unit 210 include but are not limited to a read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

In the following embodiments, a UE is used to represent the communication device 100 in FIG. 1 and a BS is used to represent the BS 102 and/or AP 104 in FIG. 1 to simplify the illustration of the embodiments.

Figure 3:
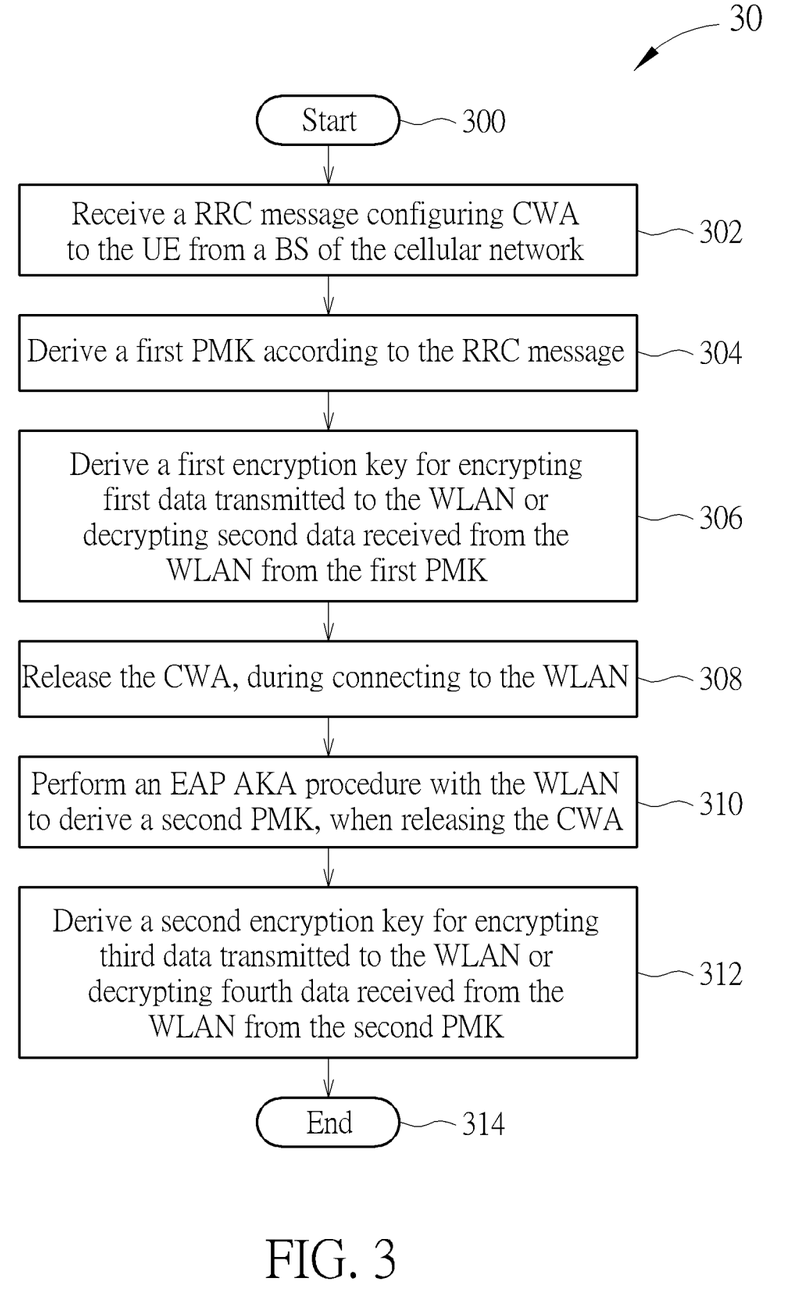
FIG. 3 is a flowchart of a process according to an example of the present invention.

FIG. 3 is a flowchart of a process 30 according to an example of the present invention. The process 30 may be utilized in a UE, to handle communication with a network including a cellular network and a WLAN. The process 30 includes the following steps:

Step 300: Start.

Step 302: Receive a RRC message configuring cellular-WLAN aggregation (CWA) to the UE from a BS of the cellular network.

Step 304: Derive a first pairwise master key (PMK) according to the RRC message.

Step 306: Derive a first encryption key for encrypting first data transmitted to the WLAN or decrypting second data received from the WLAN from the first PMK.

Step 308: Release the CWA during connecting to the WLAN.

Step 310: Perform an extensible authentication protocol (EAP) authentication and key agreement (AKA) procedure with the WLAN to derive a second PMK, when releasing the CWA.

Step 312: Derive a second encryption key for encrypting third data transmitted to the WLAN or decrypting fourth data received from the WLAN from the second PMK.

Step 314: End.

According to the process 30, the UE receives a RRC message configuring the CWA to the UE from the BS of the cellular network. The UE derives a first PMK according to the RRC message, and may derive a first encryption key for encrypting first data transmitted to the WLAN or decrypting second data received from the WLAN from the first PMK. Further, the UE releases the CWA during connecting to the WLAN. Then, the UE performs an EAP AKA procedure to derive a second PMK with the WLAN, when releasing the CWA and derives a second encryption key for encrypting third data transmitted to the WLAN or decrypting fourth data received from the WLAN from the second PMK.

In one example, the cellular network is a LTE network or a 5G network. In one example, the RRC message includes at least one parameter for the UE to derive the first PMK. Then the UE and the network derive the first encryption key from the first PMK. In one example, the UE uses the first encryption key to encrypt first data and includes the encrypted first data in a first WLAN media access control (MAC) protocol data unit (PDU) (MPDU) transmitted to the WLAN. The first data includes a first cellular PDU including an internet protocol (IP) packet. In one example, the encrypted first data is a first WLAN MAC service data unit (SDU). In one example, the UE uses the first encryption key to decrypt second data included in a second WLAN MPDU received from the WLAN. The second data includes a second cellular PDU including an IP packet. In one example, the second data is a second WLAN MAC SDU. In one example, the UE and network perform a first handshake procedure on the WLAN to derive the first encryption key. In the first handshake procedure, the UE and network exchange first cryptographic keying information by a first plurality of EAPOL-Key messages exchanged between the UE and the WLAN.

The UE performs the EAP AKA procedure with the network on the WLAN to derive the second PMK for communicating with the WLAN, when releasing the CWA. Accordingly, the network also derives the second PMK for communicating with the UE on the WLAN. Then, the UE and the network derive the second encryption key for communicating with each other from the second PMK. In one example, the UE derives the second encryption key by performing a second handshake procedure with the network. Then, the UE uses the second encryption key to encrypt third data and includes the encrypted third data in a third WLAN MPDU transmitted to the WLAN, or the UE uses the second encryption key to decrypt fourth data included in a fourth WLAN MPDU received from the WLAN. The third and fourth WLAN MPDUs don't include a cellular PDU, i.e. the third and fourth data don't have LTE headers. In one example, the third data is a third WLAN MAC SDU which includes a dynamic host configuration protocol (DHCP) message or an IP packet. The fourth data is a fourth WLAN MAC SDU which includes a DHCP message or an IP packet. In the second handshake procedure, the UE and network exchange second cryptographic keying information by a second plurality of EAPOL-Key messages exchanged between the UE and the WLAN.

The UE receives the RRC message (e.g. RRCConnectionReconfiguration) configuring the CWA (e.g. LTE-WLAN aggregation or 5G-WLAN aggregation) to the UE from the BS when the UE has a RRC connection with the BS (i.e. the UE is in RRC connected mode). The UE connects to the WLAN for the CWA when the UE has the RRC connection. The UE releases the CWA when the UE enters idle mode, when the UE in the RRC connected mode receives a release of CWA in another RRC message (e.g. RRCConnectionReconfiguration) from the BS, when the UE detects a cellular radio link failure or when the UE initiates a RRC connection reestablishment procedure with the cellular network. In one example, the UE enters the idle mode when the UE receives an RRCConnectionRelease message or an inter-radio access technology (RAT) mobility message (e.g. MobilityFromEUTRACommand) from the BS. The inter-RAT mobility message orders the UE to move to another RAT. In one example, the UE enters the idle mode when a timer (e.g. T311) expires or when receiving an RRCConnectionReestablishmentReject message from the BS.

Realization of the process 30 is not limited to the above description. The following examples may be applied to realize the process 30.

In one example, the UE transmits an EAPOL-Start message via the WLAN to trigger the network to initiate the EAP AKA procedure to the UE, when the UE releases the CWA. The UE receives a first EAP-request message initiating the EAP AKA procedure from the WLAN, wherein the first EAP-request message is transmitted by the network in response to the EAPOL-Start message. In one example, the UE may or may not perform an association procedure or a re-association procedure to the WLAN in response to releasing the CWA to trigger the network to initiate the EAP AKA procedure. The UE performs the association/re-association procedure by transmit an association/re-association request to the WLAN and receives an association/re-association response from the WLAN. The UE receives the first EAP-request message initiating the EAP AKA procedure from the WLAN, wherein the first EAP-request message is transmitted by the network in response to the association procedure or the re-association procedure . In one example, the UE may or may not perform a dissociation procedure to the WLAN, before performing the association procedure. In one example, the network initiates the EAP AKA procedure by transmitting the first EAP-request message using the WLAN in response to the association or re-association procedure.

When the UE receives the first EAP-request message from the WLAN, the UE transmits a first EAP-response message to the WLAN in response to the first EAP-request message. In one example, the first EAP-request message is an EAP-request/Identity message and the first EAP-response message is an EAP-response/Identity message. In one example, the first EAP-request message is an EAP-request/AKA-Identity message and the first EAP-response message is an EAP-response/AKA-Identity message. In one example, the first EAP-request message is an EAP-request/AKA-Challenge message and the first EAP-response/AKA-Challenge message is an EAP-response/AKA-Identity message. In one example, the first EAP-request message is an EAP-request/SIM-Challenge message and the first EAP-response/SIM-Challenge message is an EAP-response/AKA-Identity message.

When the network receives the first EAP-response message, the network transmits a second EAP-request message to the UE by the WLAN. The UE transmits a second EAP-response message in response to the second EAP-request message. In one example, when the first EAP-request message is the EAP-request/Identity message and the first EAP-response message is the EAP-response/Identity message, the second EAP-request message is the EAP-request/AKA-Identity message and the second EAP-response message is the EAP-response/AKA-Identity message. In another example, when the first EAP-request message is the EAP-request/AKA-Identity message and the first EAP-response message is the EAP-response/AKA-Identity message, the second EAP-request message is the EAP-request/AKA-Challenge message and the second EAP-response message is the EAP-response/AKA-Challenge message.

In one example, the RRC message includes a WLAN configuration including a service set identifier (SSID) of the WLAN, a basic service set identifier (BSSID) of the WLAN, an extended service set identifier (ESSID) of the WLAN and/or a homogenous extended service set identifier (HESSID) of the WLAN.

Figure 4:
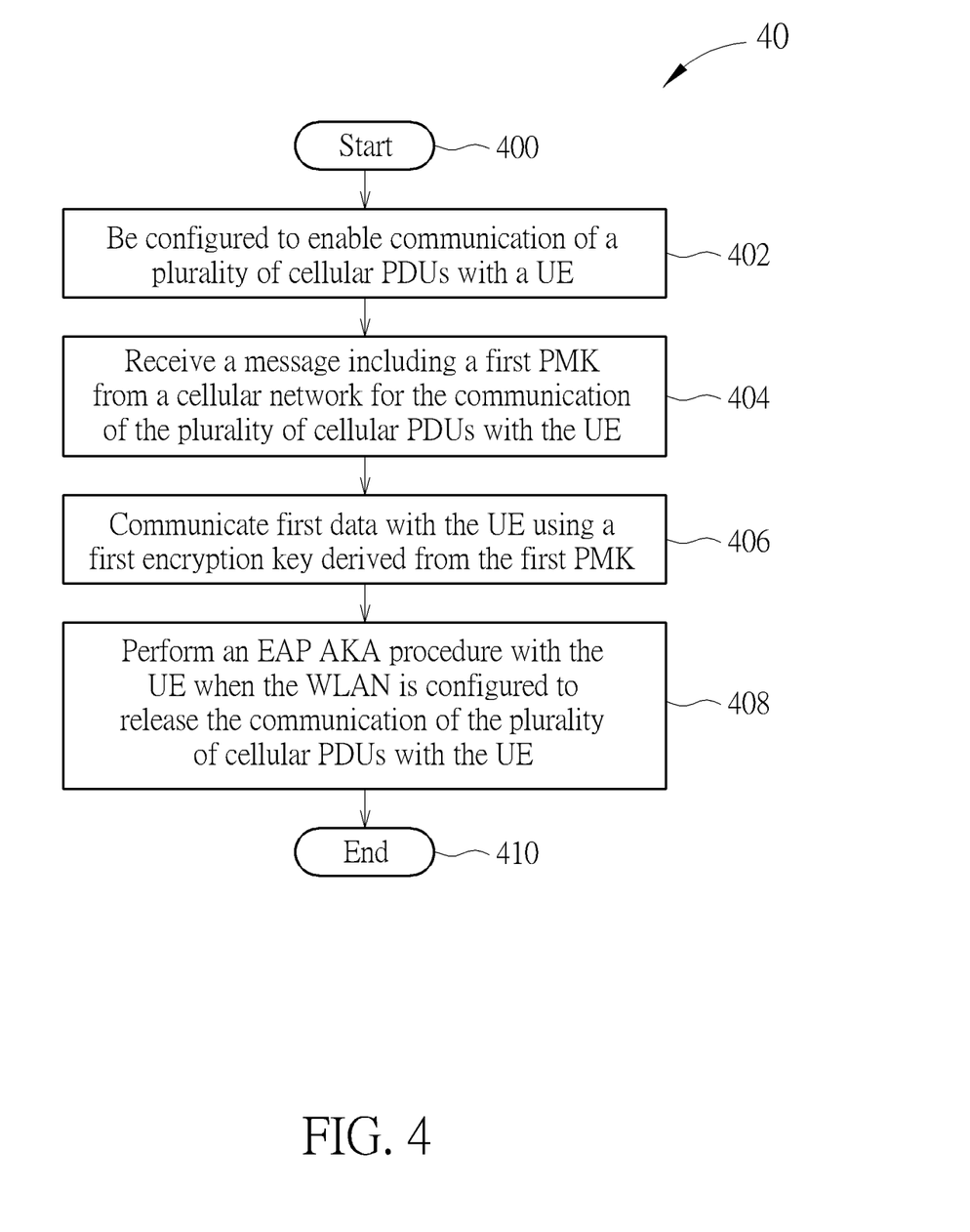
FIG. 4 is a flowchart of a process according to an example of the present invention.

FIG. 4 is a flowchart of a process 40 according to an example of the present invention. The process 40 may be utilized in a WLAN in the network described in the process 30, to handle CWA. The process 40 includes the following steps:

Step 400: Start.

Step 402: Be configured to enable communication of a plurality of cellular PDUs with a UE.

Step 404: Receive a message including a first PMK from a cellular network for the communication of the plurality of cellular PDUs with the UE.

Step 406: Communicate first data with the UE using a first encryption key derived from the first PMK.

Step 408: Perform an EAP AKA procedure with the UE when the WLAN is configured to release the communication of the plurality of cellular PDUs with the UE.

Step 410: End.

According to the process 40, the WLAN is configured to enable communication of a plurality of cellular PDUs with a UE. The WLAN receives a message (e.g., an AP addition request or an AP addition complete message) including a first PMK from a cellular network (i.e. a BS) for communication of a plurality of cellular PDUs with a UE. Then, the WLAN communicates first data with the UE using the first encryption key derived from the first PMK, i.e., the WLAN encrypts first data using the first encryption key and includes the encrypted first data in a first WLAN MPDU transmitted to the UE, and/or decrypts the first data included in a second WLAN MPDU received from the UE using the first encryption key. The first data includes a cellular PDU. Further, the WLAN performs an EAP AKA procedure with the UE, when the WLAN is configured to release the communication of the plurality of cellular PDUs with the UE (e.g., the WLAN receives an AP release request message).

In one example, the WLAN performs the EAP AKA procedure to derive (e.g., generate) a second PMK for communicating with the UE, when the WLAN is configured to release the communication of the plurality of cellular PDUs with the UE and performs an association or re-association procedure with the UE. In another example, the WLAN receives the second PMK from a network node (e.g. Authentication Authorization Accounting (AAA) server) during the EAP AKA procedure. Accordingly, the UE and the WLAN derive a second encryption key for communicating with each other from the second PMK. Alternatively, the network node derives and sends the second encryption key to the WLAN. Derivation of the first and second encryption keys, using the first and second encryption keys for data encryption/decryption described for the process 30 can be applied to the process 40 and not repeated herein. Thus, the WLAN is able to communicate data with the UE, after being configured to release the communication of the plurality of cellular PDUs with the UE.

Figure 5:
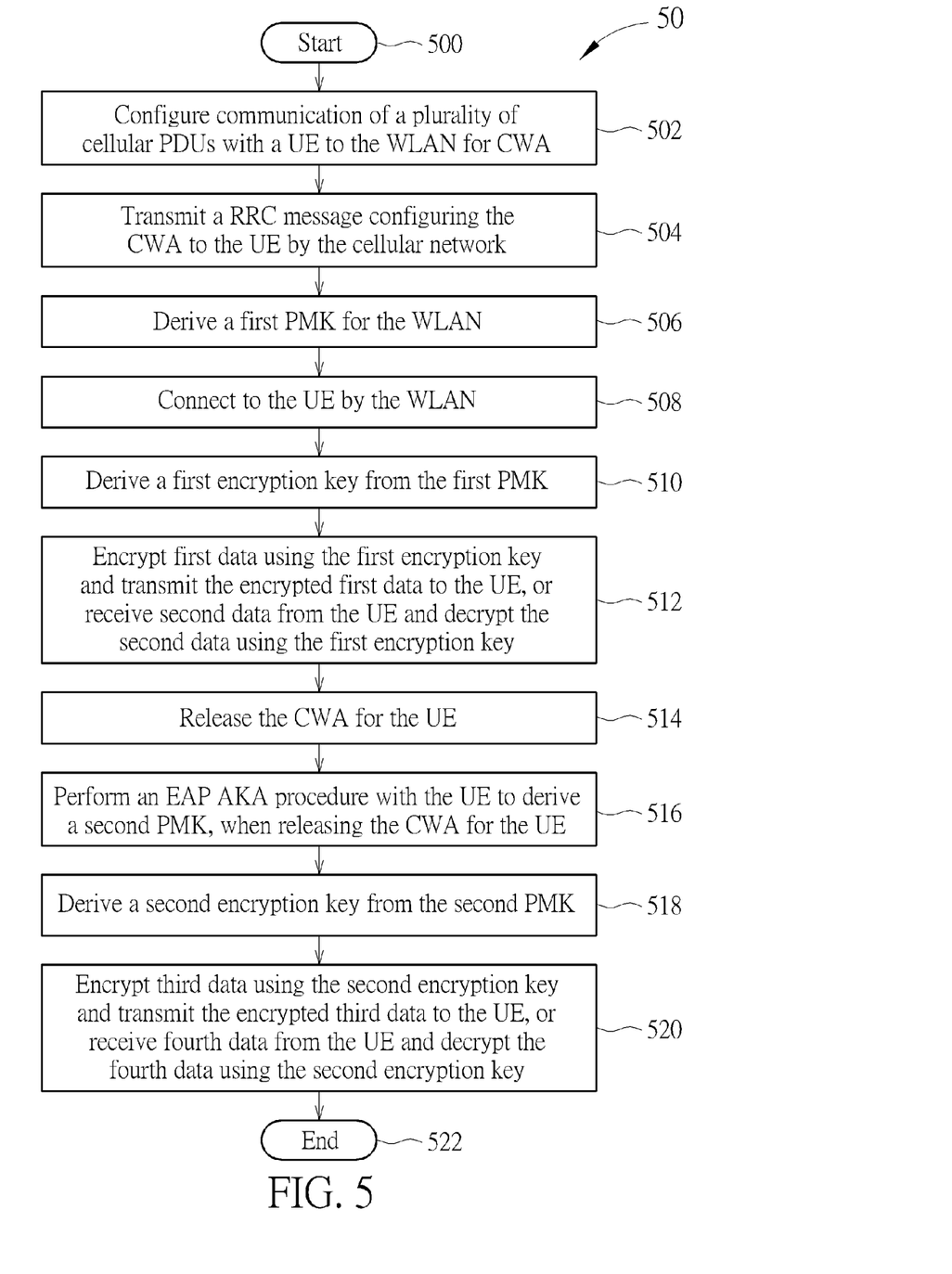
FIG. 5 is a flowchart of a process according to an example of the present invention.

FIG. 5 is a flowchart of a process 50 according to an example of the present invention. The process 50 may be utilized in the network including the cellular network and the WLAN described in the process 30. The process 50 includes the following steps:

Step 500: Start.

Step 502: Configure communication of a plurality of cellular PDUs with a UE to the WLAN for CWA.

Step 504: Transmit a RRC message configuring the CWA to the UE by the cellular network.

Step 506: Derive a first PMK for the WLAN.

Step 508: Connect to the UE by the WLAN.

Step 510: Derive a first encryption key from the first PMK.

Step 512: Encrypt first data using the first encryption key and transmit the encrypted first data to the UE, or receive second data from the UE and decrypt the second data using the first encryption key.

Step 514: Release the CWA for the UE.

Step 516: Perform an EAP AKA procedure with the UE to derive a second PMK, when releasing the CWA for the UE.

Step 518: Derive a second encryption key from the second PMK.

Step 520: Encrypt third data using the second encryption key and transmit the encrypted third data to the UE, or receive fourth data from the UE and decrypt the fourth data using the second encryption key.

Step 522: End.

According to the process 50, the network configures communication of the plurality of cellular PDUs with the UE to the WLAN for CWA. The network transmits a RRC message configuring CWA to a UE by the cellular network. The network derives (e.g., generates) a first PMK for the WLAN, e.g. by the cellular network or a network node such as an AAA server. The network connects to the UE by the WLAN. The network derives a first encryption key from the first PMK. The network encrypts first data using the first encryption key and transmits the encrypted first data to the UE, or receives second data from the UE and decrypts the second data using the first encryption key. Then the network releases the CWA for the UE. The network performs an EAP AKA procedure with the UE to derive a second PMK, when releasing the CWA for the UE. The network derives a second encryption key from the second PMK. The network encrypts third data using the second encryption key and transmits the encrypted third data to the UE, or receives fourth data from the UE and decrypts the fourth data using the second encryption key.

In one example, the network releases the CWA for the UE, e.g. by transmitting a RRC message releasing the CWA or configuring the UE to enter the idle mode as described above. Derivation of the first and second encryption keys, using the first and second encryption keys for data encryption/decryption described for the process 30 can be applied to the process 40 and not repeated herein.

Figure 6:
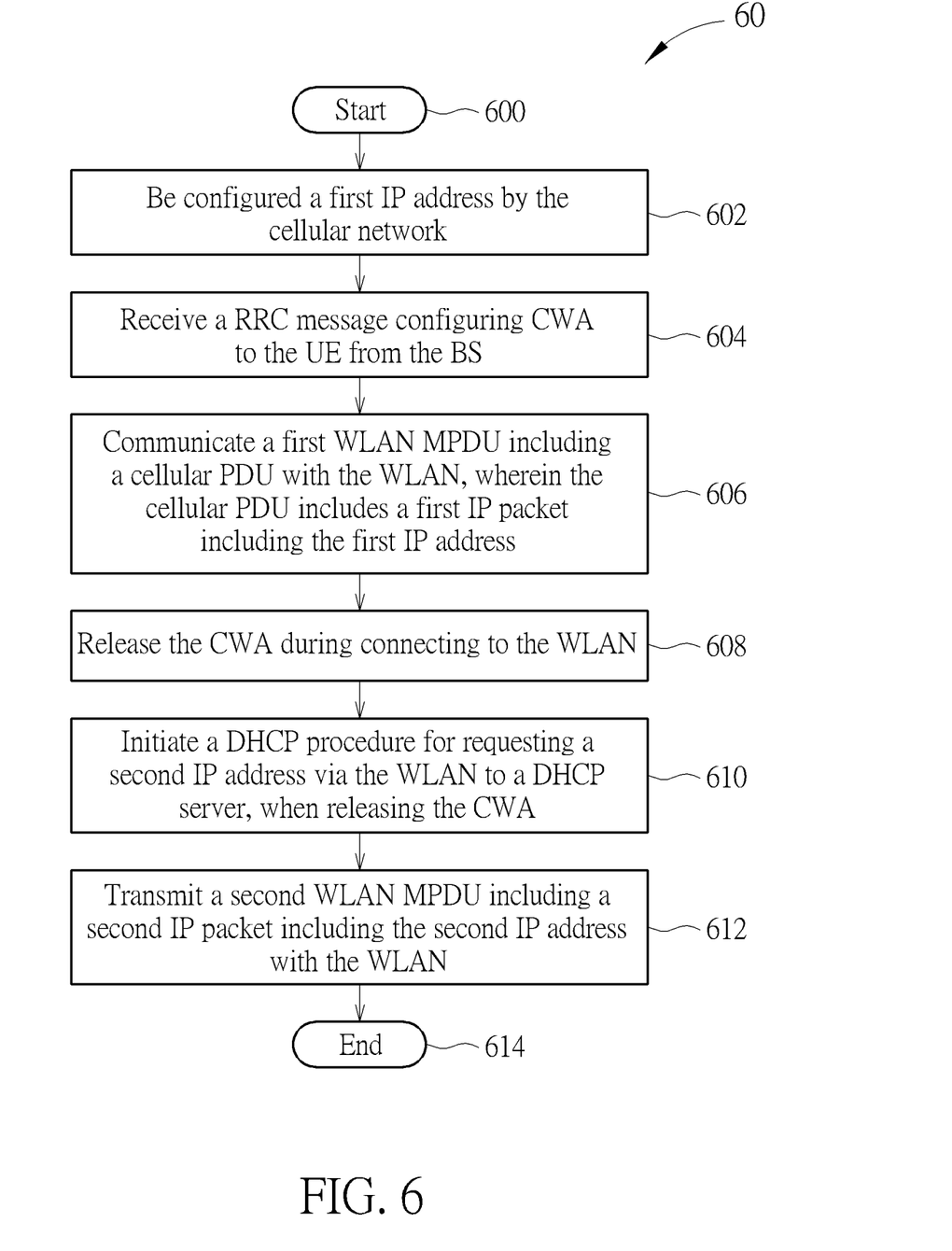
FIG. 6 is a flowchart of a process according to an example of the present invention.

FIG. 6 is a flowchart of a process 60 according to an example of the present invention. The process 60 may be utilized in a UE, to handle communication with a network including a cellular network and a WLAN. The process 60 includes the following steps:

Step 600: Start.

Step 602: Be configured a first IP address by the cellular network.

Step 604: Receive a RRC message configuring CWA to the UE from the BS.

Step 606: Communicate a first WLAN MPDU including a cellular PDU with the WLAN, wherein the cellular PDU includes a first IP packet including the first IP address.

Step 608: Release the CWA during connecting to the WLAN.

Step 610: Initiate a DHCP procedure for requesting a second IP address via the WLAN to a DHCP server, when releasing the CWA.

Step 612: Transmit a second WLAN MPDU including a second IP packet including the second IP address with the WLAN.

Step 614: End.

According to the process 60, the UE is configured a first IP address by the cellular network. Then, the UE receives a RRC message configuring the CWA to the UE from the BS. Then, the UE communicates a first WLAN MPDU including a cellular PDU with the WLAN, wherein the cellular PDU includes a first IP packet including the first IP address. Further, the UE releases the CWA during connecting to the WLAN. Then, the UE initiates a DHCP procedure for requesting a second IP address via the WLAN to a DHCP sever, when releasing the CWA. The UE transmits a second WLAN MPDU comprising a second IP packet including the second IP address with the WLAN.

That is, the UE transmits the first WLAN MPDU including the first IP packet to the WLAN when being configured the CWA, wherein a source IP address in an IP header of the first IP packet is the first IP address, or the UE receives the first WLAN MPDU including the first IP packet from the WLAN when being configured the CWA, wherein a destination IP address in an IP header of the first IP packet is the first IP address. The UE transmits the second WLAN MPDU including the second IP packet to the WLAN after releasing the CWA, wherein the second IP packet includes the second IP address as a source IP address in an IP header of the second IP packet and the second WLAN MPDU does not include a cellular PDU. In other words, the first IP address may not be used in any IP packet communicating with the WLAN anymore, after releasing the CWA.

Realization of the process 60 is not limited to the above description. The following examples may be applied to realize the process 60.

In one example, the UE transmits a DHCP REQUEST message to the DHCP server via the WLAN in the DHCP procedure. The UE receives a DHCP ACKNOWLEDGE message which responds the DHCP REQUEST message and includes the second IP address, via the WLAN from the DHCP server. The UE may or may not transmit a DHCP DISCOVERY message to the DHCP server via the WLAN. If the UE transmits the DHCP DISCOVERY message, the UE receives a DHCP OFFER message from the DHCP server via the WLAN. In one example, the UE may perform an association procedure or a re-association procedure to the WLAN, after releasing the CWA and before performing the DHCP procedure.

In one example, the UE establishes an IP tunnel (e.g. IP security tunnel) for data communication over the WLAN for CWA in response to the RRC message configuring the CWA and the IP tunnel, and releases the IP tunnel in response to releasing the CWA. That is, the UE does not use the IP tunnel anymore when releasing the CWA. Further, the UE may or may not perform a procedure (e.g., transmission) to release the IP tunnel to the WLAN. In one example, the UE releases an IP tunnel configuration of the IP tunnel directly, when receiving an RCConnectionReconfiguration message releasing the CWA. In another example, the BS releases the IP tunnel configuration directly, when transmitting the RRC-ConnectionReconfiguration message or receiving an RCConnectionReconfigurationComplete message.

Realization of any of the processes 30-60 is not limited to the above description, and the process 30 may be combined with the process 60.

In one example, the UE initiates the DHCP procedure to the DHCP server via the WLAN, after deriving the second encryption key. That is, the UE encrypts the DHCP DISCOVERY and DHCP REQUEST messages by the second encryption key and decrypts the DHCP OFFER and DHCP ACKNOWLEDGE messages by the second encryption key. Then, the UE encrypts the second IP packet using the second encryption key and includes the encrypted second IP packet in the second WLAN MPDU transmitted to the WLAN.

In one example, the cellular PDU above maybe a PDU of a cellular (e.g. LTE or 5G) protocol, e.g. Packet Data Convergence Protocol (PDCP), radio link control (RLC), medium access control (MAC) or a protocol defined specifically for CWA.

Realization of the processes 40-60 is not limited to the above description. Examples of the process 30 may be applied to realize the processes 40-60, and not repeated herein.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a method and related communication device for handling data communication after releasing the CWA. Thus, the problem of handling a connection with the WLAN is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling communication with a network including a cellular network and a wireless local area network (WLAN) comprising:
a storage device; and
a processing circuit, coupled to the storage device, wherein the storage device stores, and the processing circuit is configured to execute instructions of:

receiving a radio resource control (RRC) message configuring cellular-WLAN aggregation (CWA) to the communication device from a base station (BS) of the cellular network;
deriving a first pairwise master key (PMK) according to the RRC message;
deriving a first encryption key for encrypting first data transmitted to the WLAN or decrypting second data received from the WLAN from the first PMK;
releasing the CWA during connecting to the WLAN;
performing an extensible authentication protocol (EAP) authentication and key agreement (AKA) procedure with the WLAN to derive a second PMK, when releasing the CWA; and
deriving a second encryption key for encrypting third data transmitted to the WLAN or decrypting fourth data received from the WLAN from the second PMK.

2. The communication device of claim 1, wherein the instruction of performing the EAP AKA procedure with the WLAN comprises:
transmitting an EAP over local area network (EAPOL)-Start message via the WLAN to trigger the network to initiate the EAP AKA procedure to the communication device, when communication device releases the CWA; and
receiving a first EAP-request message initiating the EAP AKA procedure from the WLAN, wherein the first EAP-request message is transmitted by the network in response to the EAPOL-Start message.

3. The communication device of claim 1, wherein the instruction of performing the EAP AKA procedure with the WLAN comprises:
performing or not performing an association procedure or a re-association procedure to the WLAN, in response to releasing the CWA; and
receiving a first EAP request message initiating the EAP AKA procedure from the WLAN, wherein the EAP request message is transmitted by the network in response to the association procedure or the re-association procedure.

4. The communication device of claim 1, wherein the communication device derives the second encryption key by performing a handshake procedure with the network.

5. The communication device of claim 1, wherein the first data and the second data comprise at least one cellular protocol data unit (PDU), and the third data and the fourth data do not comprise any cellular PDU.

6. A wireless local area network (WLAN) of handling cellular-WLAN aggregation, comprising:
a storage device; and
a processing circuit, coupled to the storage device, wherein the storage device stores, and the processing circuit is configured to execute instructions of:

being configured to enable communication of a plurality of cellular protocol data units (PDUs) with a communication device;
receiving a message including a first pairwise master key (PMK) from a cellular network for the communication of the plurality of cellular PDUs with the communication device;
communicating first data with the communication device using a first encryption key derived from the first PMK; and
performing an extensible authentication protocol (EAP) authentication and key agreement (AKA) procedure with the communication device, when the WLAN is configured to release the communication of the plurality of cellular PDUs with the communication device;
deriving a second PMK according to the EAP AKA procedure; and
communicating second data with the communication device using a second encryption key derived from the second PMK.

7. The WLAN of claim 6, wherein the instruction of performing the EAP AKA procedure with the WLAN comprises:
transmitting a first EAP-request message initiating the EAP AKA procedure to the communication device.

8. The WLAN of claim 6, wherein the storage device further stores an instruction of:
performing an association procedure or a re-association procedure to the communication device, when the WLAN is configured to release the communication of the plurality of cellular PDUs with the communication device before performing the EAP AKA procedure.

9. The WLAN of claim 6, wherein the second data comprises a dynamic host configuration protocol (DHCP) message or an internet protocol (IP) packet.

10. The WLAN of claim 6, wherein the first data comprises a cellular PDU.

* * * * *